(12) United States Patent
Rud et al.

(10) Patent No.: US 8,408,787 B2
(45) Date of Patent: Apr. 2, 2013

(54) PROCESS TEMPERATURE TRANSMITTER WITH IMPROVED TEMPERATURE CALCULATION

(75) Inventors: Jason H. Rud, Mayer, MN (US); Loren M. Engelstad, Norwood, MN (US)

(73) Assignee: Rosemount Inc., Chanhassen, MN (US)

( * ) Notice: Subject to any disclaimer, the term of this patent is extended or adjusted under 35 U.S.C. 154(b) by 559 days.

(21) Appl. No.: 12/683,565

(22) Filed: Jan. 7, 2010

(65) Prior Publication Data
US 2010/0177800 A1 Jul. 15, 2010

Related U.S. Application Data

(60) Provisional application No. 61/143,463, filed on Jan. 9, 2009.

(51) Int. Cl.
*G01K 7/00* (2006.01)
*G01K 15/00* (2006.01)

(52) U.S. Cl. ............................. 374/183; 374/1; 374/141

(58) Field of Classification Search .................. 374/183, 374/1, 141
See application file for complete search history.

(56) References Cited

U.S. PATENT DOCUMENTS

| | | | |
|---|---|---|---|
| 3,688,190 A | 8/1972 | Blum | 324/61 |
| 3,691,842 A | 9/1972 | Akeley | 73/398 |
| 5,137,370 A | 8/1992 | McCullock et al. | 374/183 |
| 5,143,452 A | 9/1992 | Maxedon et al. | 374/170 |
| 5,171,091 A | 12/1992 | Krüger et al. | 374/183 |
| 6,356,191 B1 | 3/2002 | Kirkpatrick et al. | 340/501 |
| 6,754,601 B1* | 6/2004 | Eryurek et al. | 702/104 |
| 2005/0052274 A1 | 3/2005 | Mattoon et al. | 338/25 |
| 2009/0141771 A1* | 6/2009 | Owen et al. | 374/178 |
| 2010/0198546 A1* | 8/2010 | Kamata | 702/99 |
| 2012/0051399 A1* | 3/2012 | Rud et al. | 374/185 |

FOREIGN PATENT DOCUMENTS

| | | |
|---|---|---|
| EP | 0670481 | 9/1995 |
| JP | 60-38629 | 2/1985 |
| JP | 2005-147816 | 6/2005 |
| WO | WO 00/23776 | 4/2000 |

OTHER PUBLICATIONS

The Notification of Transmittal of the International Search Report and the Written Opinion of the International Searching Authority from international application No. PCT/US2010/020416 dated May 3, 2010.

(Continued)

*Primary Examiner* — Mirellys Jagan
(74) *Attorney, Agent, or Firm* — Christopher R. Christenson; Westman, Champlin & Kelly, PA

(57) ABSTRACT

In a process temperature transmitter, a method for providing a process temperature output is described. The method includes providing a measurement current through a circuit including a reference resistor and a resistance temperature device (RTD). A first voltage across the reference resistor is measured while the measurement current flows through it. A first voltage across the RTD is also measured while the measurement current flows through it. A first resistance of the RTD is calculated based on the measured voltage across the reference resistor and the measured first voltage. A first process temperature output is provided based on the first resistance of the RTD. A second voltage is subsequently measured across the RTD while a measurement current flows through it. A second voltage across the reference resistor is then estimated based on the measured second voltage across the RTD and the measured first voltage across the reference resistor. A second resistance across the RTD is calculated based on the measured second voltage and the estimated second voltage. A second process temperature output is provided based on the second resistance.

14 Claims, 2 Drawing Sheets

OTHER PUBLICATIONS

EPO Communication pursuant to Rules 161 and 162 EPC for corresponding European patent application No. 10700618.1 dated Aug. 19, 2011.
"Rosemount 848T Multi-Input Temperature Transmitter Family", Rosemount 848T Family Product Data Sheet dated Mar. 2008.
Office Action from the corresponding Chinese patent application No. 2010800040598 dated Oct. 10, 2012. 13 pages.
Office Action from the corresponding Japanese patent application No. 2011545438 dated Dec. 4, 2012.

* cited by examiner

PROCESS TEMPERATURE TRANSMITTER WITH IMPROVED TEMPERATURE CALCULATION

CROSS-REFERENCE TO RELATED APPLICATION

The present application is based on and claims the benefit of U.S. provisional patent application Ser. No. 61/143,463, filed Jan. 9, 2009, the content of which is hereby incorporated by reference in its entirety.

BACKGROUND

The process industry employs process variable transmitters to monitor process variables associated with substances such as solids, slurries, liquids, vapors, and gasses in chemical, pulp, petroleum, pharmaceutical, food and other fluid processing plants. Process variables include pressure, temperature, flow, level, turbidity, density, concentration, chemical composition and other properties. A process temperature transmitter provides an output related to a sensed process temperature. The temperature transmitter output is generally communicated over a process communication loop to a control room, or other process device such that the process can be monitored and/or controlled. In order to monitor a process temperature, the temperature transmitter generally includes, or is coupled to, a temperature sensor, such as a resistance temperature device (RTD).

An RTD changes resistance in response to a change in temperature. By measuring the resistance of the RTD, temperature can be calculated. Such resistance measurement is generally accomplished by passing a known current through the RTD, and measuring the associated voltage developed across the RTD.

In typical temperature transmitters, RTD measurements employ an internal fixed-resistance resistor as a reference. The reference resistor is used to measure the current flowing through the measurement circuit in order to calculate the sensor resistance. This requires two measurement points or scans for every update to get a high-accuracy resistive measurement that corresponds to a sensor temperature. Each scan typically requires a settling time and is typically converted over multiple power line cycles corresponding to the set line rejection frequency. An average RTD update can take approximately 250 milliseconds for the measurement including internal offset measurements. This time is generally not very long if the temperature transmitter is coupled to a single temperature sensor. However, with more recent process temperature transmitters, such as the high-density temperature transmitter device sold under the trade designation Model 848T Fieldbus, available from Emerson Process Management, of Chanhassen, Minn., eight RTD sensors can be employed. Using eight RTD sensors will multiply the approximately 250 milliseconds by eight. This update rate can, in some circumstances, be too slow for user acceptance. While the update rate can be increased dramatically if the reference scans are omitted, the accuracy of the temperature measurements would be prohibitively degraded.

Providing a temperature transmitter that is able to sense an RTD resistance and provide a high quality temperature output without an increased scan time would represent an advance in process industry temperature transmitters. While this advance would apply to any process industry temperature transmitters, it would be particularly beneficial to temperature transmitters that are coupled to a relatively large number of RTDs.

SUMMARY

In a process temperature transmitter, a method for providing a process temperature output is described. The method includes providing a measurement current through a circuit including a reference resistor and a resistance temperature device (RTD). A first voltage across the reference resistor is measured while the measurement current flows through it. A first voltage across the RTD is also measured while the measurement current flows through it. A first resistance of the RTD is calculated based on the measured voltage across the reference resistor and the measured first voltage. A first process temperature output is provided based on the first resistance of the RTD. A second voltage is subsequently measured across the RTD while a measurement current flows through it. A second voltage across the reference resistor is then estimated based on the measured second voltage across the RTD and the measured first voltage across the reference resistor. A second resistance across the RTD is calculated based on the measured second voltage and the estimated second voltage. A second process temperature output is provided based on the second resistance.

DETAILED DESCRIPTION

Figure 1:
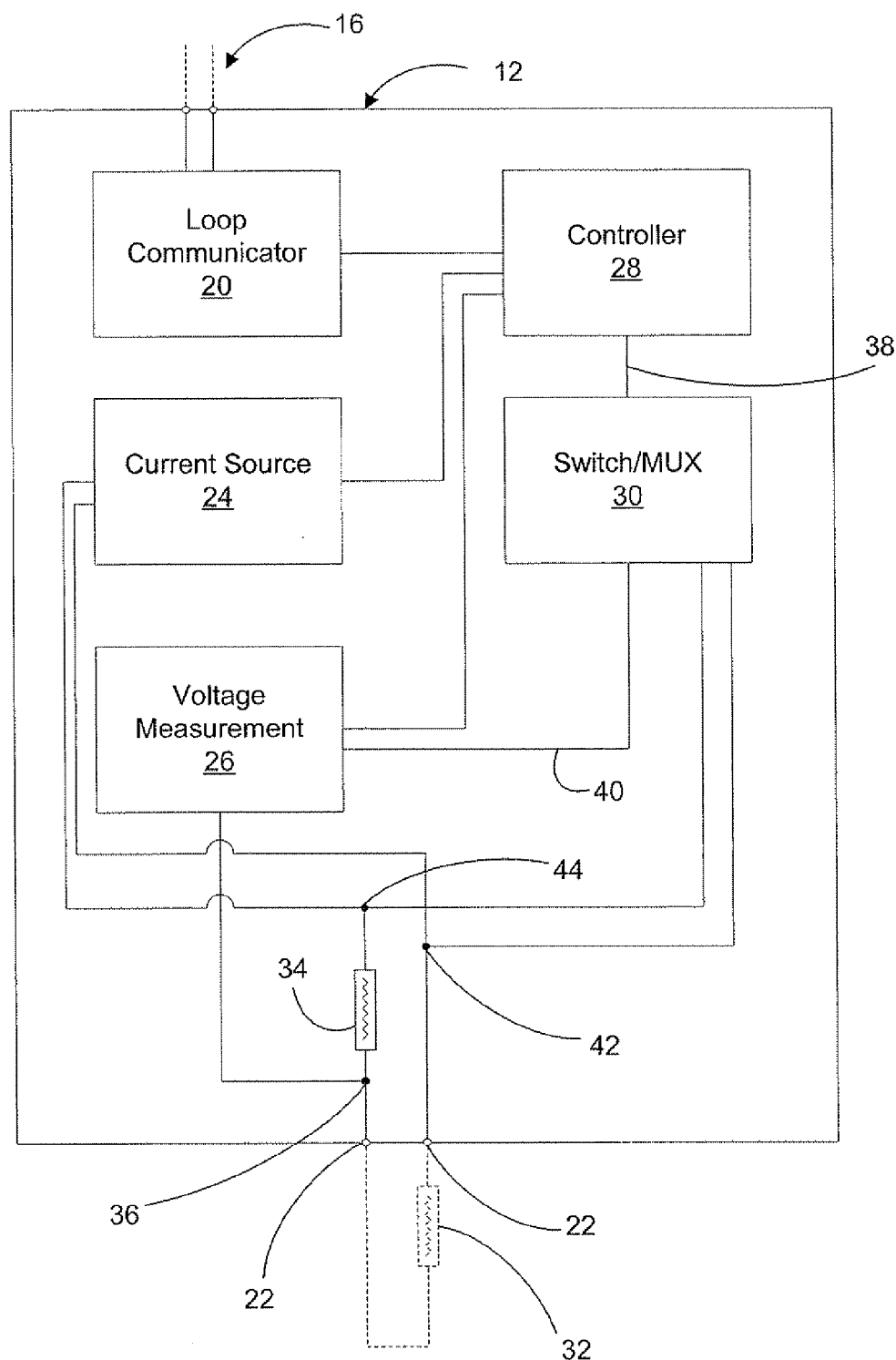
FIG. 1 is a diagrammatic view of a process temperature transmitter with which embodiments of the present invention are particularly useful.

FIG. 1 is a diagrammatic view of a process temperature transmitter with which embodiments of the present invention are particularly useful. Process temperature transmitter 12 includes loop communicator 20, a plurality of sensor terminals 22, current source 24, voltage measurement device 26, controller 28, and switch/MUX 30.

Loop communicator 20 is coupled to process control loop 16 (shown in phantom) and is adapted to communicate over process control loop 16. Process control loop 16 is any physical configuration that is capable of passing signals related to process information. For example, process communication loop 16 can be a two-wire, 4-20 mA process communication loop. A process variable transmitter coupled to such a process communication loop controls the amount of current flowing through the loop such that the current corresponds to the process variable. In some process communication loop embodiments, the energization levels are low enough to comply with an intrinsic safety specification such as that set forth in Factory Mutual Approval Standard entitled "Intrinsically Safe Apparatus and Associated Apparatus for Use in Class I, II, and III Division 1 Hazardous (Classified) Locations," class number 3610, published October 1998. Some process variable transmitters can operate on such low energy levels that they can receive all required electrical power from a 4-20 mA process communication loop.

Loop communicator 20 can include a 4-20 mA communication section for analog communication. For digital signals, loop communicator 20 can also include a highway addressable remote transducer (HART®) communication section, a FOUNDATION™ Fieldbus communication section, or any other appropriate section such as a Profibus section, a Controller Area Network (CAN) section, a DeviceNet section, or a Lonworks section. Additionally, various sections can be included together. Thus, loop communicator 20 is preferably adapted for bi-directional communication over process communication loop 16 according to one or more selected protocols in a known manner.

Process communication loop 16 can comprise any suitable number of conductors. For example, process communication loop 16 can be a two-, three-, or four-conductor process communication loop. The conductors themselves can be electrical wires, or fiberoptic media. Further, if a wireless process communication loop is to be used, then the conductors can be omitted and the adaptation of loop communicator 20 for such communication can be effected in a known manner.

FIG. 1 shows a pair of sensor terminals 22 coupled to a resistance temperature device such as RTD 32 (shown in phantom). Although FIG. 1 shows a pair of sensor terminals 22, any appropriate number of terminals can be used to couple RTD 32. Thus, the RTD measurement can be a 2, 3, or 4-wire RTD measurement. RTD 32 can be separate from transmitter 12 (as shown) or included within transmitter 12.

Current source 24 is coupled to sensor terminals 22 and is adapted to pass a measurement current through sensor terminals 22. Passing a known measurement current through an unknown resistance causes an associated voltage drop across the resistance that is indicative of the resistance. Current source 24 is shown in block form and can be any current source that provides a relatively stable current. As illustrated in FIG. 1 current source 24 also passes its current through reference resistor 34. As will be described in greater detail below, passing a current through reference resistor 34 allows the current itself to be calculated when the voltage across reference resistor 34 is measured using voltage measurement module 26 and switch/MUX 30. Once the current is measured, then a subsequent measurement of the voltage developed across RTD 32 can be used to calculate the resistance of the RTD 32 and thus the precise temperature.

Voltage measurement device 26 is coupled to node 36 and to switch/MUX 30. Switch/MUX 30 is controlled via line 38 by controller 28. This allows controller 28 to selectively couple line 40 of voltage measurement device 26 to a selected one of nodes 42, 44. As can be appreciated, when MUX 30 couples line 40 to node 44, a measurement of voltage by voltage measurement device 26 will indicate voltage across reference resistor 34. In contrast, when switch/MUX 30 couples line 40 to node 42, voltage measurement device 26 will measure the voltage across RTD 32. Voltage measurement device 26 can be any analog-to-digital converter, or any other appropriate device capable of measuring the voltage. Controller 28 is coupled to voltage measurement device 26, loop communicator 20, and switch/MUX 30. Controller 28 is adapted to provide a process temperature output value to loop communicator 20 for communication over process communication loop 16. Controller 28 can be a programmable gate array, microprocessor, or any other suitable device that is able to execute software instructions and calculate a process temperature output in accordance with embodiments of the present invention.

In accordance with embodiments of the present invention, a feedback, in one form or another, allows controller 28 to use a corrected reference scan based on a sensor input change from RTD 32 to allow controller 28 to obtain measurements of the resistance of the reference resistor less frequently than measurements of the RTD. When reference resistor 34 is not being scanned, a correction is applied to the previous reference scan which is coupled with the new sensor scan to generate a high-accuracy measurement with each sensor update. This allows temperature devices to measure the reference resistance less often and increase the update rate by as much as 25% (approximately 500 milliseconds for an eight sensor device). This also allows for wireless high density temperature devices to reduce power consumption and increase battery life by reducing the time that the measurement circuit needs to be powered.

As described above, in order to measure an RTD resistance, an excitation current is passed through both the RTD 32 and reference resistor 34. The RTD resistance can be determined ratiometrically by the equation below.

$$R_{sensor} = \frac{V_{sensor}}{V_{reference}} * R_{reference}$$

Where:
$R_{sensor}$=RTD sensor resistance
$R_{reference}$=reference resistance
$V_{reference}$=voltage measured across the reference resistor
$V_{sensor}$=voltage measured across the RTD sensor Knowing that the excitation current is common allows the calculation of a correction factor. A correction factor can be calculated to relate the change in sensor voltage to the change in reference voltage. The correction factor is determined by the amount of full scale change in measured sensor voltage over the full scale change in measured reference voltage.

$$K_{factor} = \frac{(V_{sensor@100\% \, Input} - V_{sensor@0\% \, Input})}{(V_{ref@100\% \, Input} - V_{ref@\% \, Input})}$$

Where:
$V_{sensor@100\%Input}$=voltage measured across the RTD sensor when the sensor resistance is near 100% of its range
$V_{ref@100\%Input}$=voltage measured across the reference resistor when the sensor resistance is near 100% of its range
$V_{sensor@100\%Input}$=voltage measured across the RTD sensor when the sensor resistance is near 0% of its range
$V_{ref@100\%Input}$=voltage measured across the reference resistor when the sensor resistance is near 100% of its range
$K_{factor}$=scalar used to correct the voltage measurement used for the reference resistor The correction factor can be calculated during a transmitter characterization process, or can be calculated real time during normal process measurement updates within the process. The correction factor then can be used to calculate a new estimated reference voltage measurement. This quantity is based on a previously measured reference voltage along with the amount of change between the new sensor measurement to a sensor voltage measurement taken when the reference voltage was previously measured.

$$V_{ref\_corrected} = V_{ref\_updated} + \frac{(V_{sensor} - V_{sensor@ref\_update})}{K_{factor}}$$

Where:
$V_{sensor@ref\_update}$=voltage measurement across the RTD sensor when the reference measurement was last updated $V_{ref\_updated}$=last updated voltage measurement across the reference resistor $V_{ref\_corrected}$=corrected reference voltage measurement The correction factor can be computed through a normal manufacturing characterize process or manually by monitoring raw A/D counts and calculating the factor.

Figure 2:
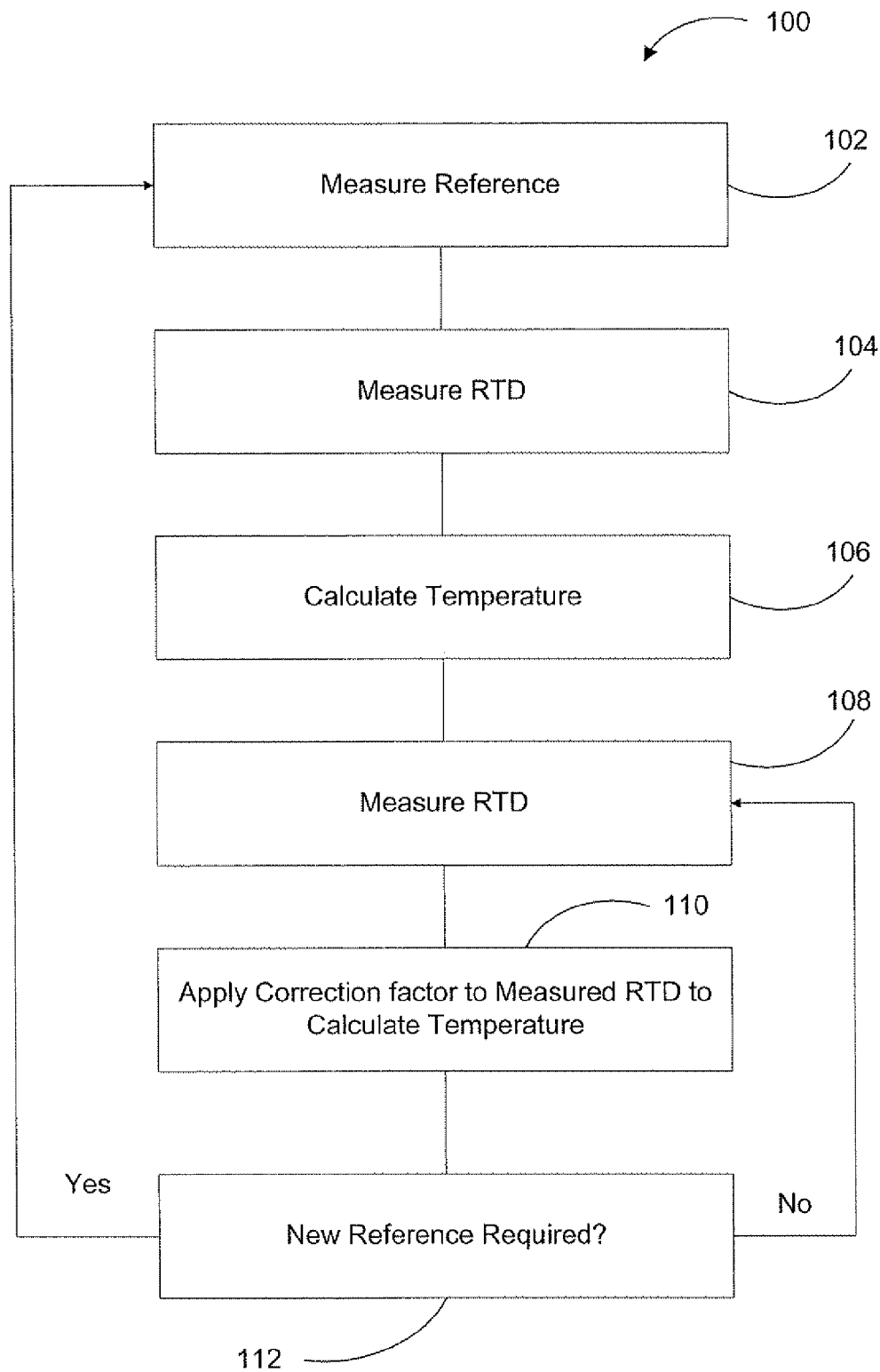
FIG. 2 is a flow diagram of a method of providing process temperature in accordance with an embodiment of the present invention.

FIG. 2 is a flow diagram of a method of providing process temperature measurement in accordance with an embodiment of the present invention. Method 100 begins at block 102 where a process temperature transmitter measures voltage developed across a reference resistor while a current is passed therethrough. At block 104, a voltage developed across an RTD is measured while the same current is passed therethrough. Note, the sequence of measuring the reference resistor before the RTD is simply provided for clarity; in reality, this sequence can be reversed. At block 106, the temperature of the process is calculated using the voltage measured across the reference resistor and the voltage measured across the RTD at blocks 102, 104, respectively, in accordance with known techniques. Next, instead of rescanning the reference resistor, block 108 executes where the voltage across the RTD is measured again. Next, at block 110, a correction factor is used to calculate a new reference voltage measurement estimate. This new calculated reference voltage measurement estimate is based on the previously measured reference voltage at block 102 along with the amount of change between the new sensor measurement at block 108 and the sensor measurement taken during the same cycle when the reference voltage was previously measured (block 104). The correction factor provides an estimated reference voltage measurement that is used by controller 28 to calculate the resistance of the RTD without having to rescan the reference resistor. At block 110, controller 28 provides a process temperature output based on the voltage measured at block 108, and a correction factor-compensated reference measurement. Next, at block 112, it is determined whether a new reference is needed. This determination can be based upon any number of factors. For example, it can be simply a count of the number of RTD scans since the last reference resistance measurement was made. For example, controller 28 can be configured to scan the reference resistor every third, fourth, or tenth RTD scan. Additionally, or alternatively, the determination can also be based upon the resistance of temperature sensor 32 itself. Preferably, a pair of thresholds or bands bracket the sensor input, and when the sensor input crosses either the upper threshold or lower threshold, a new reference scan will be performed. If a new reference scan is required, control passes from block 112 to block 102 along line 114. Conversely, if a new reference scan is not needed, control simply returns to block 108 via line 116.

The correction factor can be automatically calculated by the temperature transmitter by setting thresholds that allow the transmitter to take "snapshots" in time of the measurement A/D counts. Two thresholds are required, a high and low. Once the temperature transmitter measures sensor input values beyond the threshold, it can hold the A/D counts until it reaches the other threshold. When counts are collected beyond each threshold, a correction factor can be computed by controller 28 of temperature transmitter 12. This can provide a useful method for automatically characterizing the correction factor through manufacturing, but can also be used for normal operation.

By applying a temperature compensation to a reference interpolation method, it can be used to detect when the reference resistance has drifted over time and temperature. If the reference resistor 34 drifts, the detection method can be used to re-trim the characterized coefficients in order to maintain a high accuracy measurement or simply alert the user or process control system that temperature transmitter 12 can no longer measure within the accuracy specifications. This option could increase the safe failure fraction for SIS temperature products.

The change ratio can also be applied to analyze line frequency measurement influence. Typically, temperature transmitters have a setting to allow users to select either a 50 Hz or 60 Hz filter. This changes the update rate to be at time intervals of (filter order)/(line frequency). This may not be needed normally being that most installations are well-wired and grounded. The line frequency content may be negligible. In this case, all that the filter would be doing is slowing the update rate. If the change ratio equation were used to analyze the line frequency influence, the update rate could be increased when line frequency would have no influence on the measurement. If the line frequency influence were not high enough to affect the sensor measurement, the change ratio would be outside of a preset limit and allow the temperature transmitter to select the proper line filter to reduce the effect.

This method can also be used to understand influences of electromagnetic interference on the sensor measurement and qualify the update. Similar to the line frequency influence concept, the sensor measurement and reference measurement along with the change ratio can be used essentially as a "sanity" check on the measurement. If the measured reference and the reference generated by the ratio equation are outside of some preset limit, the temperature transmitter can hold off on that measurement from being reported to the process control system. The transmitter could then hold the last good value, perform a remeasure, or provide a diagnostic alert or other suitable information to the user.

Although the concepts presented herein have been described with reference to particular embodiments, workers skilled in the art will recognize that changes may be made in form and detail without departing from the spirit and scope of the following claims.

What is claimed is:

1. In a process temperature transmitter, a method for providing a process temperature output, the method comprising:

providing a measurement current through a circuit including a reference resistor and a resistance temperature device (RTD);

measuring a first voltage across the reference resistor while the measurement current flows therethrough;

measuring a first voltage across the RTD while the measurement current flows therethrough;

calculating a first resistance of the RTD based on the measured voltage across the reference resistor and the measured first voltage across the RTD;

providing a first process temperature output based on the first resistance of the RTD;

measuring a second voltage across the RTD while a subsequent measurement current flows therethrough, the second measurement occurring after measurement of the first voltage;

estimating a second voltage across the reference resistor based on the measured second voltage across the RTD and the measured first voltage across the reference resistor;

calculating a second resistance across the RTD based on the measured second voltage and the estimated second voltage; and providing a second process temperature output based on the second resistance.

2. The method of claim 1, wherein the measuring steps are performed using an analog-to-digital converter of the process temperature transmitter, and wherein the calculations are performed using a processor of the process temperature transmitter.

3. The method of claim 1, wherein at least one of the first process temperature output and second process temperature output is provided over a process communication loop.

4. The method of claim 1, wherein and further comprising:
measuring a third voltage across the RTD while a second subsequent measurement current flows therethrough, the second subsequent measurement occurring after measurement of the second voltage;
estimating a third voltage across the reference resistor based on the measured third voltage across the RID and the measured first voltage across the reference resistor;
calculating a third resistance across the RTD based on the measured third voltage and the estimated third voltage across the reference resistor; and
providing a third process temperature output based on the third resistance.

5. The method of claim 4, wherein the measurement of the third voltage across the RTD, estimation of the third voltage across the reference resistor, calculation of the third resistance across the RTD, and the provision of the third process temperature are repeated until a feedback condition is determined.

6. The method of claim 5, wherein the feedback condition is based on a number of RTD measurement cycles performed.

7. The method of claim 5, wherein the feedback condition is based on the process temperature output.

8. The method of claim 1, wherein estimating the second voltage is also based on a correction factor.

9. The method of claim 8, wherein the correction factor is based on a ratio of (a difference between a voltage across the RTD at a full scale input and a voltage across the RTD at zero input) and (a difference between a voltage across the reference resistor at a full scale input and a voltage across the reference resistor at zero input).

10. The method of claim 9, wherein the correction factor is calculated during a transmitter characterization process.

11. The method of claim 9, wherein a change in the correction factor over time can be detected in order to apply a correction to voltage measured across the reference resistor.

12. The method of claim 9, wherein a change in correction factor over time is detected and used to provide diagnostic information.

13. The method of claim 12, wherein the diagnostic information is related to an influence of line frequency.

14. The method of claim 12, wherein the diagnostic information is related to electromagnetic interference on the RTD measurements.

* * * * *